3,460,974
METHOD OF PRODUCING CONSTANT LOW PRESSURE OF HYDROGEN IN CATHODE RAY TUBE

Aden J. King, 2202 E. Colvin St., Syracuse, N.Y. 13210
No Drawing. Filed Feb. 17, 1966, Ser. No. 528,077
Int. Cl. C03c 17/02
U.S. Cl. 117—97          2 Claims

ABSTRACT OF THE DISCLOSURE

A method of producing a constant low pressure of hydrogen in a cathode ray tube by providing a film of alkaline earth metal, such as barium and the hydride of such metal on the interior of the tube envelope.

---

It is known that the presence of a constant low pressure of hydrogen in a cathode ray tube is beneficial to the operation of the tube and particularly extends the useful life of the tube.

This invention has as an object a particularly convenient and economical method for producing a constant low pressure of hydrogen within a cathode ray tube and has as a further object a gettering mixture particularly suitable for carrying out my method.

In general, my method consists in forming on the inner surface of the tube a film comprising an alkaline earth metal and the hydride of said metal. Such film may be formed by forming a layer of the alkaline earth metal on the inner surface of the tube envelope and providing free hydrogen either before or after forming the layer of metal.

There are various arrangements which may be employed in the practise of my invention by way of making hydrogen available in the tube for forming the hydride in the deposited film.

The hydrogen may be provided by injecting hydrogen gas into the tube, or by liberating hydrogen from a hydrogen source material positioned in the tube. The hydrogen source material may consist of one of a number of metal hydrides, or hydroxides.

In the formation of the alkaline earth metal film, I prefer to use barium because of its known superior quality for gettering the tube. If barium is used in the formation of the film, hydrogen within the tube will, upon contact with the barium film, immediately form barium hydride. The barium hydride dissociates into free barium (or barium subhydride), and hydrogen, according to one or perhaps both of the equations.

$$2BaH_2 \rightleftharpoons 2BaH - H_2$$

or $$BaH_2 \rightleftharpoons Ba - H_2$$

The equilibrium dissociation pressure of the reaction establishes the constant low hydrogen pressure within the tube. As determined at room temperature by a mass spectrograph, the hydrogen pressure is in the neighborhood of $3 \times 10^{-8}$ torr. This pressure will vary slightly with variation in temperature.

If a metal hydride is employed as a hydrogen source, it may be a hydride of an alkaline earth metal, as calcium, strontium and barium, or lithium hydride, or a hydride of a rare earth metal, as cerium, lanthanum and Misch metal. However, due to better stability and handling characteristics, I prefer hydrides of the fourth group metals, as titanium, zirconium, hafnium and thorium. The metal hydride may be mixed with a barium-aluminum gettering alloy, the mixture being embedded in a metal container positioned within the tube and flashed in the conventional manner subsequent to the evacaution and sealing of the tube. This results in the deposit of a film of barium on the inner surface of the tube envelope to serve as the gettering agent, and the flashing of the getter mixture, containing the metal hydride, results in the liberation of hydrogen from the hydride. The hydrogen is then available in the tube for forming barium hydride which thereafter, effects the equilibrium dissociation pressure.

As en example, the desired film may be formed by a gettering mixture containing a gettering alloy having 53% barium-47% aluminum, and forming 100 parts by weight of the mixture, the mixture also containing one to three parts by weight of the hydrogen source material. The ratio of the gettering alloy to the hydrogen source material will vary somewhat with the type of hydride, or other hydrogen source material being employed, and by the consumption of hydrogen by a specific tube. However, the ratio should be such that the deposited film contains free alkaline earth metal. For example, the formation of a film containing one to fifteen percent barium hydride and eighty-five to ninety-nine percent barium has resulted in an abnormally good performance during an extended life test of a cathode ray tube.

What I claim is:
1. The method of producing a constant low pressure of hydrogen in a cathode ray tube consisting of forming on the inner surface of the tube a film comprising an alkaline earth metal and the hydride of said metal, said film containing 85 to 99% alkaline earth metal and 1 to 15% of the hydride of said metal.
2. The method of producing a constant low pressure of hydrogen in a cathode ray tube consisting of forming on the inner surface of the tube a film comprising barium and barium hydride, said film containing 85 to 99% barium and 1 to 15% barium hydride.

References Cited

UNITED STATES PATENTS

| | | | |
|---|---|---|---|
| 1,861,643 | 6/1932 | Pirani | 313—223 X |
| 2,156,414 | 5/1939 | Wamsley. | |
| 2,497,911 | 2/1950 | Reilly et al. | 313—223 X |

ALFRED L. LEAVITT, Primary Examiner

CHARLES R. WILSON, Assistant Examiner

U.S. Cl. X.R.

117—124; 313—179